Nov. 4, 1969    A. D. KAHN    3,476,199
DOLLY FOR BURIAL VAULTS
Filed Nov. 17, 1967    2 Sheets-Sheet 1

INVENTOR.
ASHER D. KAHN,
BY
Berman, Davidson & Berman
ATTORNEYS

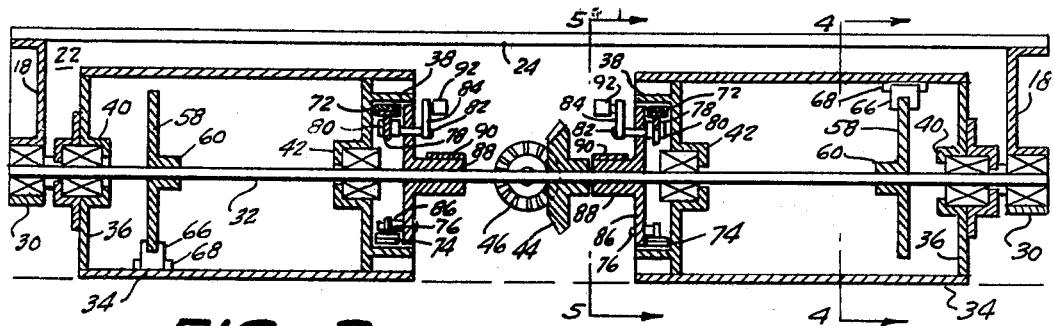

United States Patent Office 3,476,199
Patented Nov. 4, 1969

3,476,199
DOLLY FOR BURIAL VAULTS
Asher D. Kahn, 2700 Virginia Ave. NW.,
Washington, D.C. 20037
Filed Nov. 17, 1967, Ser. No. 683,945
Int. Cl. B62d 57/00; B62b 1/00, 5/00
U.S. Cl. 180—20                                    12 Claims

ABSTRACT OF THE DISCLOSURE

A dolly for transporting a heavy burial vault comprising an open rectangular frame having side and end members, a transverse shaft extending across said frame substantially centrally thereof, a pair of cylindrical traction rollers rotatable upon said transverse shaft and disposed between the side members of the frame, a longitudinal drive shaft extending from said transverse shaft to one end of the frame, gear means connecting said drive shaft to said transverse shaft, pawl and ratchet means within each of said pair of cylinders for connecting said transverse shaft to drive each of said cylinders in one direction but permitting rotation in the opposite direction when a drive clutch is disengaged, means for attaching a power unit to said one end of the frame, and coupling means for connecting said drive shaft to a drive axle of said power unit.

---

The present invention relates generally to load-carrying devices of the dolly type, and more particularly to a dolly suitable for use in moving heavy concrete burial vaults from the fabricating plant to a grave site, the dolly carrying the vault being loaded on and transported by truck to the cemetery, but having its own attachable power unit for automatically propelling the vault from the cemetery gate to the grave site.

As will be readily appreciated, burial vaults, because of their great weight, being usually formed of concrete and weighing one to two tons, give rise to handling problems both in transport to the cemetery and from the cemetery gate to the grave site, the latter portion of the journey being particularly affected by the condition of the terrain in the cemetery and the lack of space between monuments, grave markers, and the like. Conventional dollies now in use are subject to the following disadvantages, among others. The dollies when loaded are very heavy and cannot be easily maneuvered by a single man at the cemetery. When provided with a power unit for propelling the dolly with the vault thereon, said power unit is usually affixed to the dolly and protrudes therefrom so as to limit the number of dollies with vaults thereon which can be loaded on a truck at the fabricating plant for transport to the cemetery, and the maneuverability within the cemetery because of the irregular dolly shape and resultant extra space occupied by the dolly and power unit. This disadvantage occurs whether the power unit itself is mounted at the side or end of the dolly, or whether it is mounted above the dolly and drives wheels or rollers mounted at the sides of the dolly. Present types of power-driven dollies are of such design as to require blocking, chaining, or otherwise securing the dollies to a flat bed truck during transport with the vault. Conventional dollies, being unprovided with brakes, are not easily unloadable from said truck, but require the efforts of two or more men and extra apparatus such as block and tackle, or winch, for the unloading operation. The arrangement of the dolly traction rollers is normally not such that maximum traction is obtained to easily move the heavy vault, nor is sharp turning maneuverability possible, particularly when the conventional dolly is provided with a power drive unit. It is particularly not possible to disconnect the power unit and freely turn and maneuver the dolly with the vault thereon, by manual power, along narrow, crooked paths. When the grave site is reached the conventional dolly normally cannot be positioned over the grave for subsequent assembly of a vault lowering device around the vault, so that additional equipment is required to lift the vault from the dolly to a position over the grave for lowering by standard apparatus.

It is a primary object of the present invention to provide a dolly for transporting burial vaults which will obviate the briefly outlined disadvantages of conventional dollies, as mentioned above.

It is an important object of the present invention to provide a dolly which is lightweight, has a low center of gravity, and which conforms in peripheral shape to and is the same size or smaller in horizontal section than the burial vault which it is adapted to transport.

It is another important object of the invention to provide a dolly, having the above described characteristics, which, together with its load, can be manually pushed by a single person and which can be easily maneuvered to turn about its center by manual force.

Another object of the invention is to provide a dolly, having the above described characteristics, which, in addition to being manually propelled on level surfaces, may be propelled on upward slopes by a motor, means being provided to quickly attach a separable power unit to drive the dolly.

A further object of the invention is to provide a dolly, having the above described characteristics, in which the power unit, when attached, drives the dolly with its load in one direction only, said power unit having clutch means which permits uncoupling of the power drive train for manual propelling and manual turning movements in narrow spaces.

Yet another object of the invention is to provide an improved dolly, having the above described features and advantages, in which is provided means for coupling and supporting a separable power drive unit at one end of the frame for propelling the dolly in a forward direction on cemetery ground, said pair of rollers being so coupled to a drive axle of the dolly as to permit rotation of the traction rollers in opposite directions under hand pressure applied to the loaded vault for a minimum turning radius of the loaded dolly.

A further object of the invention is to provide a dolly, having the above described characteristics, which is provided with brakes, whereby a maximum number of loaded dollies may be transported on a truck and may be unloaded from the truck on inclined ski boards by appropriate use of the brakes, and which may be propelled over hilly terrain within the cemetery, the brakes preventing undue acceleration or movements in undesired directions of the loaded dolly.

It is a still further object of the invention to provide a dolly, having the above described features and characteristics, wherein a pair of large, in-line, coaxial traction rollers are provided centrally and transversely of an open dolly frame, the rollers clearing the upper load bearing surface of the frame by only a small distance, the frame being provided with intermediate cross-members covered by friction pads to prevent slippage of the burial vault, or other load, when the dolly travels on inclined skids or hilly terrain, or while being transported on the truck over a highway, and said large rollers providing maximum traction centrally of the frame and minimum damage to turf over which it is propelled, smaller rollers being provided at the ends of the frame to prevent damage to landscaped terrain upon longitudinal tilting of the frame under load.

The novel features that are considered characteristic of the invention are set forth with particularity in the appended claims. The invention, itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

FIG. 3 is a transverse sectional view taken on line 3—3 of FIG. 2, and looking in the direction of the arrows;

FIG. 4 is a fragmentary sectional view taken on line 4—4 of FIG. 3, and looking in the direction of the arrows;

FIG. 5 is a fragmentary sectional view taken on line 5—5 of FIG. 3, and looking in the direction of the arrows;

FIG. 6 is an exploded view showing one end of the dolly partly in section and the power unit ready to be assembled with and mounted thereon;

FIG. 7 is a rear elevation of a flat bed truck loaded with a plurality of dollies carrying burial vaults; and FIG. 8 is a fragmentary side elevation of the loaded truck of FIG. 7.

Figure 1:
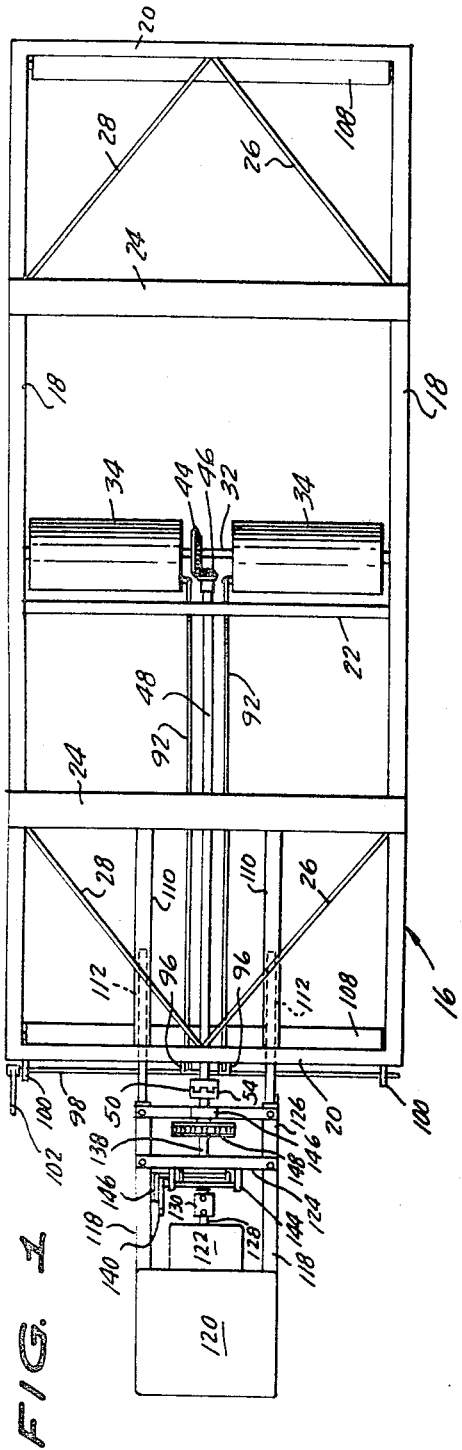
FIG. 1 is a plan view of a dolly according to the invention with an attached power unit, but without any load.
Figure 2:
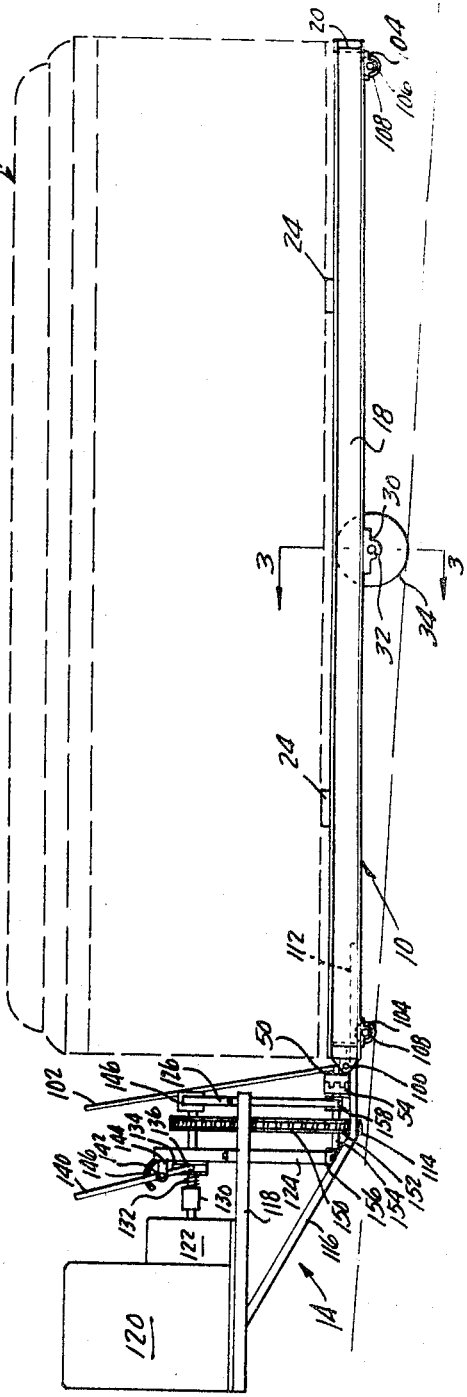
FIG. 2 is a side elevation of the dolly of FIG. 1, a burial vault being shown in broken lines loaded on the dolly.

Referring now more particularly to the drawings, and especially to FIGS. 1–3 thereof, FIG. 2 illustrates a dolly, according to the invention, generally indicated by the numeral 10 upon which is loaded a heavy concrete burial vault 12, as shown in broken lines, and to which dolly is affixed a separable power unit 14 for propelling the dolly and vault over cemetery grounds particularly where upwardly sloping inclines are prevalent between the cemetery gate, or unloading point, and the grave site.

The dolly 10 comprises an open frame 16 formed of side channel members 18 of aluminum, aluminum alloy, or other suitable metal, and being of U-shape and lying on their sides as best seen in FIG. 3. Similar end channel members 20 connect the side members 18 to form a generally rectangular frame. The frame may advantageously be about 35 inches wide by 90 inches long, the side and end channels each being about 1½ inches by 4 inches in peripheral dimensions. Intermediate channel members 22 of the same configuration connect the side members and certain of these are covered by friction pads 24 which seat the vault 12 to prevent slippage.

The underside of the burial vault preferably has the same, or larger, dimensions and the same shape as the frame so that the transport dolly does not protrude beyond the peripheral borders of the vault, thus permitting the loaded dolly to freely maneuver in narrow paths between gravestones, monuments, and the like, wherever the vault, itself, is free to move.

Within the confines of the frame 16 and at each end thereof is provided a pair of bracing rods 26, 28 connecting the center of the end member 20 to the ends of the closest intermediate cross-brace member 22. Other suitable stiffening and bracing members may be used, when and if required.

Centrally of the frame 16 and on opposite side members 18 is mounted a pair of bearing brackets 30 carrying suitable friction-free bearings for journaling a transverse shaft 32. Two large diameter, cylindrical, traction rollers 34 are mounted in end-to-end relation on said transverse shaft and between the side members 18, each roller having an end plate 36 and a brake drum 38 carrying recesses 40, 42, for reception of ball type bearings, which journal the transverse shaft and which permit the rollers and shaft to rotate freely with respect to each other. Between the rollers 34, and fixed to the transverse shaft 32 is a bevel gear 44 which meshes with a bevel pinion 46 secured to the end of a longitudinally disposed drive shaft 48 extending from the center of the frame to and through journal bearing openings, not shown, in the bracing members 22 and one end member 20. A coupling disc 50 having axially projecting fingers 52 is secured to the outer end of the drive shaft 48 for coupling to a complementary, fingered disc member 54, 56 carried by the separable power unit 14. Each traction roller 34 is internally provided with a ratchet disc 58, secured to the transverse shaft 32 by any suitable means, as by the collar 60 and a locking screw, not shown. The circumference of the disc 58 is serrated as by a series of similar saw teeth 62, FIG. 4, having radial edges 64 engageable with the end of a pawl 66 pivoted at 68 to the inner surface of its respective drum and pressed inwardly by a leaf spring 70 attached at one end to the inner surface of the drum. The radial edges 64 of teeth 62 enable turning movements of the transverse shaft to be imparted through the end of the pawl 66 to turn the drum in a clockwise direction, as viewed in FIG. 4, or forwardly, when the transverse shaft 32 is driven by the power unit 14. The inclined edges 72 of the teeth will cam the pawl outward when the roller is turning clockwise faster than the shaft, or when the shaft is not turning. If the roller turns counterclockwise, the pawl engages the tooth of the ratchet wheel and turns the entire drive train counterclockwise up to the clutch. Thus, when the dolly is turned under hand pressure, the roller which turns clockwise is cammed, the other is engaged and turns counterclockwise together with the shaft and drive train. Hand pressure may be exerted against the dolly, or against the vault seated thereon. When power is supplied to the transverse shaft, both traction rollers 34 are rotated to propel the dolly and its load forwardly, and when the drive is de-clutched from said transverse shaft, the dolly may be pushed forwardly, or rearwardly, the rollers turning in either direction. By exerting pressure at one corner or another of the vault seated on the dolly, the dolly may be turned in either direction, the dolly pivoting around its center point, or the point approximately at the location of the gears 44, 46, one roller turning in one direction while the other turns in the opposite direction.

The rollers 34 are preferably formed of steel with as large diameter as possible while still permitting a slight clearance of an inch or so under a vault seated on the frame. Suitable dimensions for each cylinder are a diameter equal to 8 inches and a length equal to 13 inches. Since all of the traction of the loaded dolly is concentrated in the two cylinders 34, a smaller engine in the power unit may be used than if the traction were to be spread over a plurality of longitudinally spaced rollers. To increase the traction the outer cylindrical surfaces of the rollers are preferably embossed with a diamond-tread design, not shown, or any other suitable design of ribs which will increase the friction or grip of the rollers on the turf.

To stop dolly movement, or to slow its speed, a brake is provided on each traction roller 34. The brake may be of any suitable type, a conventional mechanical brake of the automobile type being illustrated in FIGS. 3 and 5, as comprising a pair of arcuate brake shoes 72, 74 arranged as circular segments within each brake drum and pivoted at 76 so that they may be spring biased, in a manner not shown, inwardly away from the drum flange 38, or moved into frictional engagement therewith. To perform the latter function, each brake shoe carries a follower 78 riding in an S-shaped cam 80 turned by the pin 82 and the crank arm 84. Each pin 82 passes through an aperture in a cover disc 86 which closes the brake drum 38 and protects and conceals the associated brake shoes. Each cover disc 86 is integral with a collar, or sleeve 88, which journals the transverse shaft 32 and which is prevented from rotation by a bracket arm 90 secured thereto at one end, and secured at its other end to an intermediate brace member 22 of the dolly frame. Each crank arm 84 is secured to a longitudinally disposed rod 92 which slidingly passes with a loose fit through bushings 94, FIG. 5, held in apertures in the cross brace members 22 and one end frame member 20 to a point at the rear of frame 16 where it is pivotally secured to a clevis 96 fixed to a transverse rod 98, FIG. 1. The rod 98 is journaled in a pair of end brackets 100 and is turnable by a hand lever 102 extending upwardly and away from the rear of the dolly. Thus, manual force applied forwardly to the upper end of the brake lever 102 will turn the transverse rod 98 and move both longitudinal rods 92 forwardly, or to the right in FIG. 5, to turn the crank arms 84 and cam the brake shoes 72, 74 in both traction rollers so as to swing them outwardly into frictional engagement with the inner surfaces of the brake drum 38.

At each corner of the dolly frame are bearing brackets 104 journaling ends of the transverse shafts 106 on which are mounted the end rollers 108 of much smaller diameter than the traction rollers 34. The end rollers 108 are also supported within the peripheral confines of the dolly frame and function to provide rolling contact with the ground and to prevent injury to the turf should the loaded dolly tilt either forwardly or rearwardly under load, as well as in up or down dolly movements on sloping surfaces.

Referring now more particularly to FIGS. 1, 2 and 6, one end, preferably, the rear end of the dolly frame 16 is provided with a pair of spaced parallel tubes 110 welded at their inner ends to an intermediate brace member 22 and passing through apretures in the web of the end channel member 20 to which the tubes are welded, or otherwise suitably secured. The sleeves 110 telescopically receive rod-like projecting members 112, of power unit 14, which are fixed to upwardly and rearwardly inclined brace bars 116 at points 114 spaced rearwardly of the dolly frame 16 in the assembled condition of the power unit. The brace bars 116 are connected at their upper ends to a pair of horizontal, parallel bars 118 on the rear of which is seated and secured a gasoline engine 120 and a gear reduction unit 122 which may be of conventional type. The forward ends of bars 118 and 116 are connected to a vertical, rectangular bracing frame 124 and a similar vertical rectangular frame 126 connects the bars 118 with the positioning prongs 112. The output shaft 128 of the gear unit 122 has secured thereto a collar 130 to which is affixed a coiled spring 132 surrounding the output shaft and pressing forwardly on a splined frictional disc, or cone, 134 adapted to engage a cooperating friction disc 136 affixed to the rear end of a driven shaft 138. The discs 134, 136 comprise a conventional clutch manually operable by a lever 140 connected at one end by a yoke to the disc 134 and pivoted at 142 intermediate its ends on a bracket 144 secured to a clutch housing mounted on vertical frame 124. A toothed, arcuate, latching segment 146 cooperates with clutch lever 140 to hold the clutch open against the bias of spring 132. The forward end of the driven shaft 138 is journaled in a bearing 146 and carries a sprocket 148 connected by a chain 150 to another sprocket 152 affixed to a second and parallel driven shaft 154 disposed at a lower level in line with the dolly drive shaft 48. The shaft 154 is journaled in bearings 156, 158 mounted in frames 124 and 126 respectively, and the forward end of the shaft has affixed thereto the coupling disc 54 whose forwardly directed teeth engage the teeth on the complementary disc 50 when the power unit prongs 112 are fully inserted in the sleeves 110 of the dolly frame 16. The length of the prong rods 112, which extend into the sleeves 110, is sufficient to support the weight of the power unit from the dolly frame, and tilting of the dolly frame downwardly is normally prevented in spit of the weight of the power unit by the heavier weight of the vault seated on the dolly. It will be apparent that the power unit, when thus assembled to the dolly frame, is capable of driving the dolly forwardly by reason of the engagement of clutch discs 134, 136, the coupling 50, 54, and the ratchet pawl means 58, 66 in each of the traction rollers 34. Should the driving speed be too great for the terrain encountered, a single operator walking beside the dolly may push the clutch lever 140 forwardly to disconnect the power unit drive, or alternatively, may merely press the brake lever to apply suitable braking force. In the first instance, with the clutch 134, 136 disengaged, maneuvering of the dolly and vault, either forwardly, backwardly, or in turning movements, is quite possible by applying hand pressure to the vault, a previously explained.

In use of the improved dolly, it is intended that a burial vault, upon manufacture in a fabrication plant, will be seated on its own individual dolly. Since the vault and the dolly have the same horizontal dimensions, a maximum number of loaded dollies can be placed transversely on a flat bed truck 156, as illustrated in FIGS. 7 and 8, without loss of space and without transgressing road and carrier regulations which require the width of a load not to exceed 8 feet. In loading the dollies on the truck, each is seated on low horses 158 positioned at the ends of the dollie frames and of sufficient height only as to raise the traction rollers from the upper bed surface of the truck. The single power unit suitable for attachment to any one of the four dollies so loaded on the truck may be carried in the truck cab, or elsewhere, without reducing the number of vaults which may be loaded on the truck. The vaults are thus transported on the truck to a cemetery gate, or other unloading point within the cemetery, at which time parallel skids may be inclined at angles from 20° to 40° against the rear or either side of the truck and the horses 158 removed. It is then possible for a single operator to safely roll a dolly and its supported vault down the skids, applying brake pressure as necessary, by means of the brake lever 102. Once a vault and dolly are unloaded from the truck, they may be moved to a grave site by manually pushing, or a power unit 14 may be attached to the dolly and the dolly then automatically driven up or down slopes to the grave site. At any time during such movement when the narrowness of path, or the presence of obstacles requires slowing of speed and careful maneuvering, the brake may be applied, or the clutch lever may be moved to disengage the clutch of the power unit, and the maneuvering accomplished by hand pressure of the operator, in the manner previously described. Once the grave site is reached the dolly is propelled across the grave onto grave boards and a conventional vault lowering device, such as the Wilbertway, manufactured by Wilbert W. Haase Company, may be assembled around the dolly and vault. These devices are very low cable hoists supported by four pedestal legs which are positioned at the corners of the vaults and extend only slightly higher than the vault. The lowering cable may then be suitably secured about the vault and the vault lifted slightly to allow the dolly to be pushed endwise out from under the lowering device. The vault may then be lowered into the grave by the lowering device in the usual way.

While the improved dolly has been described in accordance with its main function in transporting burial vaults, it should be quite apparent that the device is suitable for transporting other heavy objects, such as monuments, gravestones, marble, and the like.

Although a certain specific embodiment of the invention has been shown and described, it is obvious that many modifications thereof are possible. The invention, therefore, is not to be restricted to the embodiment shown and described, but is considered to include reasonable equivalents.

What is claimed is:

1. A dolly for transporting a burial vault comprising side and end members secured together to define an open frame of generally rectangular shape, transverse shaft means mounted in bearings carried by said side members and extending across said frame substantially centrally thereof, a pair of cylindrical traction rollers between said side members of the frame mounted for rotation in both directions about said transverse shaft means as an axis so as to permit sharp turning movements with said rollers turning in opposite directions, coupling means for removably attaching a power unit to one end of said frame, and power drive transmission means including a differential mechanism for connecting said coupling means to drive said cylinders.

2. A dolly according to claim 1, wherein said differential mechanism includes pawl and ratchet means within each of said pair of cylinders for connecting said transverse drive shaft means to drive said cylinders.

3. A dolly according to claim 1 in combination with a rectangular burial vault, the dimensions of said frame corresponding substantially to and being no larger than the horizontal cross-sectional dimensions of said vault.

4. A dolly according to claim 1 wherein an additional roller is mounted at each end of said frame, said additional rollers being of smaller diameter than said pair of traction rollers.

5. A dolly according to claim 1 wherein said frame includes a pair of cross bracing members each disposed between said pair of traction rollers and the end members of the frame and connected to the side members, the upper surfaces of said cross bracing members being provided with non-skid pads for reception and seating of a vault to prevent shifting thereof.

6. A dolly for transporting a burial vault comprising side and end members secured together to define an open frame of generally rectangular shape, transverse shaft means mounted in bearings carried by said side members and extending across said frame substantially centrally thereof, and a pair of cylindrical tration rollers mounted for rotation in both directions about said transverse shaft means as an axis and disposed between said side members of the frame, whereby to permit sharp turning movements with one of said rollers turning in one direction while the other turns in the opposite direction, each of said traction rollers having a brake drum affixed thereto, a friction shoe pivotally secured to a member affixed to the frame, and means for swinging said shoe to engage the drum for braking action.

7. A dolly according to claim 6 wherein said means for swinging each brake shoe comprises a cam, a bell crank for turning said cam pivoted to a link rod extending longitudinally of the frame, said pair of link rods being crank-connected to a transverse rod at one end of said frame, and a brake lever secured at its bottom to said transverse rod and extending upwardly and away from the frame.

8. A dolly for transporting a burial vault comprising side and end members secured together to define an open frame of generally rectangular shape, transverse shaft means mounted in bearings carried by said side members and extending across said frame substantially centrally thereof, and a pair of cylindrical traction rollers mounted for rotation in both directions about said transverse shaft means as an axis and disposed between said side members of the frame, whereby to permit sharp turning movements with one of said rollers turning in one direction while the other turns in the opposite direction, said dolly further including a longitudinally disposed drive shaft extending from said transverse shaft means to one end of the frame, gear means connecting said drive shaft to said transverse shaft means, pawl and ratchet means within each of said pair of cylinders for connecting said transverse shaft means to drive each of said cylinders in one direction, means for attaching a power unit to said one end of the frame, and coupling means for connecting said drive shaft to a drive shaft of said power unit.

9. A dolly according to claim 8 in combination with a power unit separably attachable to the dolly for driving the same, said power unit comprising a gas engine, a gear reduction unit, a clutch connecting the gear reduction unit to a first sprocket, a shaft having a second sprocket fixed thereto, chain means connecting said first and second sprockets, and a coupling connected to said shaft for engagement with said coupling means.

10. A dolly in combination with a power unit as set forth in claim 9 wherein said gas engine is mounted on a support frame elevated above a pair of rods below and parallel to said support frame and projecting forwardly therefrom, said rod being connected to said support frame by upwardly inclined bracing elements.

11. A dolly in combination with a power unit according to claim 10 in which said clutch is provided with a manually operable lever for selectively engaging and disengaging the drive relation between the engine and said coupling on said shaft.

12. A dolly in combination with a power unit according to claim 11 wherein each of said traction rollers is provided with a brake drum affixed to the roller, a friction shoe pivotally secured to a member affixed to the frame, means for swinging said shoe to engage the drum for braking action, said means for swinging each brake shoe comprising a cam, a bell crank for turning said cam pivoted to a link rod extending longitudinally of the frame, said pair of link rods being crank-connected to a transverse rod at one end of said frame, and a brake lever secured at its bottom to said transverse rod and extending upwardly and away from the frame.

References Cited

UNITED STATES PATENTS

| | | | |
|---|---|---|---|
| 835,130 | 11/1906 | George | 180—20 |
| 849,527 | 4/1907 | Bowers | 280—47.16 |
| 1,174,899 | 3/1916 | Rupert | 180—20 |
| 1,407,235 | 2/1922 | Taylor. | |
| 1,623,298 | 4/1927 | Bell | 280—47.16 |
| 2,799,409 | 7/1957 | Kelly | 280—47.16 X |
| 3,295,861 | 1/1967 | Lull | 280—47.16 |
| 511,793 | 1/1894 | Philion | 280—47.16 |
| 3,187,830 | 6/1965 | Hilton | 180—20 |

FOREIGN PATENTS 174,099   1/1961   Sweden.

LEO FRIAGLIA, Primary Examiner

J. A. PEKAR, Assistant Examiner

U.S. Cl. X.R.

280—47.16, 79.1